(12) United States Patent
Madhvapathy et al.

(10) Patent No.: US 9,984,653 B1
(45) Date of Patent: May 29, 2018

(54) METHOD AND DEVICE FOR REDUCING VIDEO LATENCY

(71) Applicants: SYNAPTICS INCORPORATED, San Jose, CA (US); SYNAPTICS LLC, Zug (CH)

(72) Inventors: Prakash Madhvapathy, San Jose, CA (US); Yongchun Li, Pleasanton, CA (US)

(73) Assignees: SYNAPTICS INCORPORATED, San Jose, CA (US); SYNAPTICS LLC, Zug (CH)

( * ) Notice: Subject to any disclaimer, the term of this patent is extended or adjusted under 35 U.S.C. 154(b) by 0 days. days.

(21) Appl. No.: 14/966,897

(22) Filed: Dec. 11, 2015

Related U.S. Application Data (60) Provisional application No. 62/114,781, filed on Feb. 11, 2015.

(51) Int. Cl.
*G09G 5/00* (2006.01)
*G06T 1/60* (2006.01)
*H04N 19/44* (2014.01)

(52) U.S. Cl.
CPC ............ *G09G 5/006* (2013.01); *G06T 1/60* (2013.01); *H04N 19/44* (2014.11); *G09G 5/003* (2013.01)

(58) Field of Classification Search
CPC ........ G09G 5/006; G09G 5/003; H04N 19/44; G06T 1/60
USPC ........ 345/204, 698, 520; 348/500, 571, 739; 386/200, 353
See application file for complete search history.

(56) References Cited

U.S. PATENT DOCUMENTS

| | | | | |
|---|---|---|---|---|
| 6,470,051 B1* | 10/2002 | Campisano | .......... | H04N 19/159 375/240.21 |
| 2002/0075293 A1* | 6/2002 | Charisius | .................. | G06F 3/00 345/704 |
| 2006/0059245 A1* | 3/2006 | Toma | ...................... | G06T 15/16 709/219 |
| 2007/0171976 A1* | 7/2007 | Toma | ............... | H04N 21/23614 375/240.15 |
| 2009/0109988 A1* | 4/2009 | Musunuri | ............... | H04L 12/56 370/412 |
| 2010/0135381 A1* | 6/2010 | Hamamoto | ...... | H04N 21/23406 375/240.01 |
| 2010/0265342 A1* | 10/2010 | Liang | ..................... | H04N 5/145 348/208.4 |
| 2012/0226728 A1* | 9/2012 | Knee | .................. | H03H 21/0012 708/301 |
| 2013/0300846 A1* | 11/2013 | Miller | ..................... | H04N 7/183 348/65 |

(Continued)

*Primary Examiner* — Ke Xiao
*Assistant Examiner* — Kim-Thanh T Tran
(74) *Attorney, Agent, or Firm* — Paradice and Li LLP (57) ABSTRACT

Aspects of the disclosure provide a method for reducing video latency. The method includes decoding compressed video data into video frames and storing the video frames in a frame buffer for subsequent display by a display interface, logging decoding ending times of video frames and display times of video frames to generate a latency history over a first window of time, and adjusting a display rate of the display interface based on the latency history over the first window of time in order to change waiting times of video frames, the waiting time of a video frame being a difference between the decoding ending time of the video frame and the display time of the video frame.

20 Claims, 4 Drawing Sheets

(56) References Cited

U.S. PATENT DOCUMENTS

| | | | |
|---|---|---|---|
| 2014/0189091 A1* | 7/2014 | Tamasi | H04L 43/0858 709/224 |
| 2015/0181239 A1* | 6/2015 | Chen | H04N 21/234381 375/240.07 |

* cited by examiner

METHOD AND DEVICE FOR REDUCING VIDEO LATENCY

INCORPORATION BY REFERENCE

This present disclosure claims the benefit of U.S. Provisional Application No. 62/114,781, "Video Latency Reduction" filed on Feb. 11, 2015, which is incorporated herein by reference in its entirety.

BACKGROUND

In typical non-interactive applications, such as Internet Protocol television (IPTV) or Digital Living Network Alliance (DLNA) certified devices, video latency is important only as it relates to delaying audio to maintain lip synchronization. More video latency would entail bigger audio buffers to introduce matching latency in the audio path. However, in interactive applications, such as game screen mirroring using WiFi display, also referred to as Miracast, video latency becomes critically important for good user experience.

SUMMARY

Aspects of the disclosure provide a method for reducing video latency. The method includes decoding compressed video data into video frames and storing the video frames in a frame buffer for subsequent display by a display interface, logging decoding ending times of video frames and display times of video frames to generate a latency history over a first window of time, and adjusting a display rate of the display interface based on the latency history over the first window of time in order to change waiting times of video frames, the waiting time of a video frame being a difference between the decoding ending time of the video frame and the display time of the video frame.

Embodiments of the method includes determining an average waiting time of video frames based on the latency history over the first window of time, increasing the display rate of the display interface to reduce the waiting times of video frames when the average waiting time of video frames is longer than a maximum display latency of a display latency window, and decreasing the display rate of the display interface to increase the waiting times of video frames when the average waiting time of video frames is shorter than a minimum display latency of the display latency window.

In an embodiment, determining the average waiting time of the video frames based on the latency history over the first window of time includes filtering the latency history to determine the average waiting time of video frames. In another embodiment, determining the average waiting time of the video frames based on the latency history over the first window of time includes removing a momentarily changed waiting time from a sequence of waiting times used for determining the average waiting time of video frames, the sequence of waiting times being computed based on the latency history over the first window of time.

In an embodiment, adjusting the display rate of the display interface to change the waiting times of video frames based on the latency history further includes determining a change rate of the display rate of the display interface for adjusting the display rate of the display interface, the change rate being in a range acceptable to a display device connected to the display interface. In another embodiment, adjusting the display rate of the display interface to change the waiting times of video frames based on the latency history further includes determining a change rate of the display rate of the display interface for adjusting the display rate of the display interface based on a trade-off between a convergence speed of the waiting times of video frames converging to the display latency window and a frame dropping rate caused by overshooting of adjustment of the display rate of the display interface.

The method further includes adjusting the maximum display latency or the minimum display latency of the display latency window according to a history of waiting times over a second window of time. The method further includes synchronizing decoding starting times of video frames and the display times of the display interface based on timing information included in the compressed video data. The method further includes, after an adjustment of the display rate of the display interface, waiting for a predetermined period of time before another adjustment of the display rate of the display interface.

Aspects of the disclosure provide a device. The device includes a decoder to decode compressed video data into video frames and store the video frames in a frame buffer, a frame buffer to store the video frames, a display interface to display the video frames at a display rate, a logger to log decoding ending times of video frames and display times of the video frames to generate a latency history over a first window of time, and a display controller to adjust a display rate of the display interface based on the latency history over the first window of time in order to change waiting times of video frames, the waiting time of a video frame being a difference between the decoding ending time of the video frame and the display time of the video frame.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
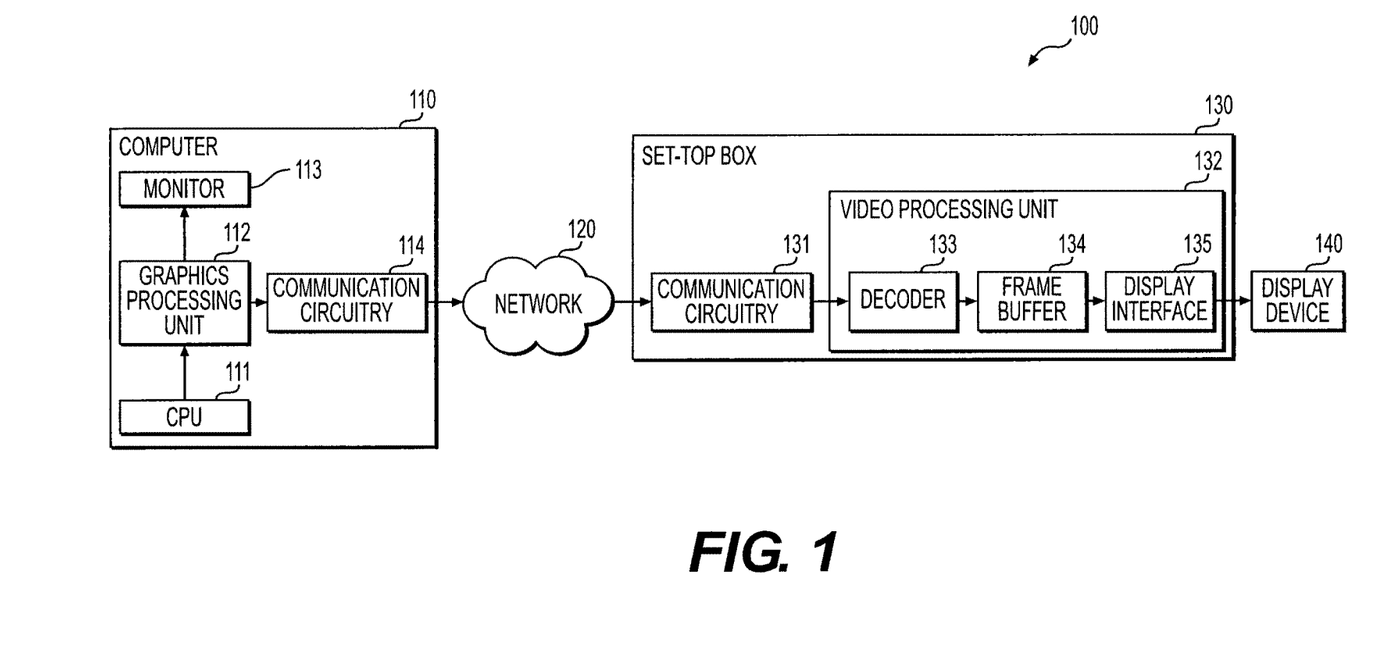
FIG. 1 shows a gaming system according to an embodiment.

FIG. 1 shows a gaming system 100 according to an embodiment of the disclosure. The gaming system 100 includes a computer 110, a set-top box 130, and a display device 140. The computer 110 is coupled with the set-top box 130 via a network 120 (e.g., a wired or wireless network), and the set-top box 130 is coupled with the display device 140, for example, using a High-Definition Multimedia Interface (HDMI) cable. A computer game runs on the computer 110, however, video data generated at the computer 110 is transmitted to the set-top box 130 and displayed at the display device 140. As a result, the gaming screen is mirrored to the display device 140 from a monitor of the computer 110. A user can play the computer game in front of the display device 140 instead of the monitor of the computer 110 and control the computer game using a game controller (not shown) connected with the computer 110. According to an aspect of the disclosure, a scheme for reducing video latency incurred at the set-top box can be adopted to improve the user's gaming experience.

The computer 110 can be any type of computer suitable for running the computer game, such as a desktop computer, a laptop computer, a mobile phone, and the like. In one example, the computer 110 includes a central processing unit (CPU) 111, a graphics processing unit (GPU) 112, a monitor 113, and communication circuitry 114. The CPU 111 executes instructions of the game program and issues drawing commands to the GPU 112. The GPU 112 generates video data based on the drawing commands from the CPU 111. The video data can include a sequence of video frames or images. Each frame can include an array of pixels, and each pixel can include binary bits indicating color depths of two or more colors associated with the pixel.

The video data can be encoded and compressed by an encoder according to various video coding standards before transmission to the set-top box 130. The compressed video data can include a sequence of compressed frames in an example. The encoder can be a component of the GPU 112 (not shown) or implemented in other software applications, such as the program of the computer game. In an example, the GPU 112 includes an encoder that compresses the video data using the MPEG-4 Part 2 video compression standard to generate compressed video data in MPEG-4 Part 2 format. In other examples, other video compression standards, such as the High Efficiency Video Coding (HEVC), the MPEG-4 Part 10, and the like, can be used by an encoder at the computer 110 to generate compressed video data in a format corresponding to the video compression standard used.

The communication circuitry 114 is configured to receive the compressed data from the encoder described above and transmit the compressed video data to the set-top box 130 via the wireless network 120. In an example, the communication circuitry 114 includes a WiFi network interface controller based on the IEEE 802.11 standard, and the communication circuitry 114 is configured to use Miracast technology to transmit the compressed video data to the set-top box 130. The Miracast technology is specified by the WiFi Display specification developed by the WiFi Alliance, and provides an interoperable mechanism to discover, pair, connect and render multimedia content sourced from a WiFi Display source at a WiFi Display sink. In this scenario, the wireless network 120 is a peer-to-peer connection based on WiFi Direct connection between the computer 110 and the set-top box 130. In another example, the communication circuitry 114 also includes a WiFi network interface controller based on the IEEE 802.11 standard, however, the communication circuitry 114 is configured to transmit the compressed video data via the wireless network 120 which is a WiFi wireless local area network (WLAN).

The monitor 113 is configured to receive the video data from the GPU 112 via a video display interface and display the images to a screen of a cathode ray tube (CRT) or a liquid-crystal display (LCD). The video display interface can be Video Graphic Array (VGA), Digital Visual Interface (DVI), HDMI, and the like.

The wireless network 120 is configured to provide a communication channel for transmission of the compressed video data. As described, the wireless network can be a WiFi LAN or a WiFi direct connection between the computer 110 and the set-top box 130 in various embodiments.

The set-top box 130 is configured to receive the compressed video data from the computer 110, decode the compressed video data, and present the video frames included in the video data to the display device 140. In an embodiment, the set-top box includes communication circuitry 131 and a video processing unit 132. The communication circuitry 131 is configured to receive the compressed video data via the wireless network 120 and transmit the compressed video data to the video processing unit 132. Similar to the communication circuitry 114, in various embodiments, the communication circuitry 131 can include a WiFi network interface controller based on the IEEE 802.11 standard. Accordingly, in one example, the communication circuitry 131 can use the Miracast technology to receive the compressed video data via a peer-to-peer WiFi direct connection between the communication circuitry 114 and 131. Alternatively, in another example, the communication circuitry 131 can use the wireless network 120 which is a WiFi LAN to receive the compressed video data.

The video processing unit 132 is configured to decode the compressed video data and display the frames included in the compressed video data. In an example, the video processing unit 132 includes a decoder 133, a frame buffer 134, and a display interface 135. The decoder 133 is configured to decode the compressed video data into the video frames and store the video frames in the frame buffer 134. For example, in an embodiment, the encoder at the computer 110 encodes the video data into a video compression format based on the MPEG-4 Part 2 standard. Accordingly, the decoder 133 is implemented based on the MPEG-4 Part 2 standard and performs an inversion of the compression process performed by the encoder at the computer 110. In other examples, other video compression standards, such as the High Efficiency Video Coding (HEVC), the MPEG-4 Part 10, and the like, can be used by an encoder at the computer 110. Accordingly, the decoder 133 can be implemented based on the other video compression standards and performs the decoding operations. The decoder 133 can be implemented with hardware, software, or combination thereof in various embodiments.

During the decoding process, decoding the compressed video data to generate a video frame by the decoder 133 can last for a period of time (referred to as frame decoding time). The time when the decoder 133 starts a decoding operation for decoding the compressed video data corresponding to a video frame is referred to as a decoding starting time of the video frame, while the time when the decoder 133 completes the decoding operation for decoding the compressed video data corresponding to the video frame is referred to as a decoding ending time of the video frame. In an example, during the decoding process of a video frame, the decoder 133 writes decoded video data (the binary bits of pixels) into the frame buffer 134 while decoding the video frame. When all decoded video data corresponding to the video frame is written into the buffer 134, the decoding operation of the video frame is completed.

The frame buffer 134 is configured to store the video frames generated from the compressed video data at the decoder 133. In an embodiment, the frame buffer 134 is implemented using a random access memory (RAM), such as a synchronous dynamic random access memory (SDRAM). In an example, the frame buffer can include multiple buffer sections, e.g., three buffer sections, each being used for storing a video frame. When a first video frame (referred to as a current video frame) in a first buffer section is being displayed to the display interface 135, a second video frame (referred to as a next video frame) can be written into a second buffer section from the decoder 133. After the decoding operation of the second video frame is completed, the second video frame in the second buffer section becomes the current video frame and can be displayed to the display interface 135 according to a display timing of the display interface 135. Subsequently, a third video frame can be written into a third buffer section. In such a way, sequence of video frames can be stored into the frame buffer 134 and displayed to the display interface 135 sequentially and continually.

The display interface 135 is configured to display the video frames to the display device 140 at a preconfigured display rate. Specifically, the display interface 135 reads a video frame from the frame buffer 134, and based on a display interface standard, converts the binary bits of pixels included in the video frame to a video signal and subsequently transmits the video signal to the display device 140. In various embodiments, the display interface standard can be the VGA standard, DVI standard, HDMI standard, DisplayPort standard, and the like. The display rate for displaying the video frames refers to a frequency, e.g., 60 Hz, at which the display interface 135 reads video frames from the frame buffer 134 and display the video frames to the display device 140. For example, a display rate of 60 Hz means that the display interface 135 reads sixty video frames per second from the frame buffer and display the sixty video frames per second to the display device 140.

During the decoding and displaying process described above, after the decoding operation of a video frame is completed, the video frame in the frame buffer 134 waits for being displayed. For example, the next frame in the frame buffer waits for being displayed until the display timing of the display interface 135 is ready, then the display interface 135 starts to read the video frame from the frame buffer 134. Thus, a waiting time of the video frame occurs causing video latency at the video processing unit 132. The waiting time of a video frame is the difference between the decoding ending time of the video frame and a display time of the video frame. The display time of the video frame refers to a time when the display interface 135 starts to read the video frame from the video frame buffer 134.

The waiting time of a video frame can vary depending on the changes of the timings of the decoding ending time and the display time of video frames. Usually, after the display rate of the display interface 135 is configured, the timings of the display times of video frames are fixed, and may not be related to the decoding ending times of video frames in some embodiments. However, the timings of the decoding ending times of video frames can vary and is unpredictable according to an aspect of the disclosure. For example, the decoding ending time of a video frame can depend on an arriving time of the video data corresponding to the video frame, while the arriving time of the video data can be affected by multiple factors, such as transmission delay at the wireless network 120, processing speed of the encoder at the computer 110, speed of the GPU 112, frequency fluctuations of reference clock signals at the computer 110, and the like. In addition, the decoding ending time of the video frame can also depend on the decoding time of the video frame consumed at the decoder 133 which can change from frame to frame. Thus, the waiting times of video frames in the frame buffer 124, as the difference between the decoding ending time of the video frame and the display time of the video frame, can be unpredictable and vary, for example, between zero and reciprocal of the display rate.

According to an aspect of the disclosure, the scheme for reducing video latency incurred at the video processing unit 132 can dynamically adjust the display rate of the display interface 135 to change the display times of the video frames, thus adjusting the waiting times of video frames to improve the video latency.

The display device 140 is configured to receive the video signal transmitted from the display interface 135 and display the frames included in the video signal, for example, to a CRT or a flat panel display, such as an LCD panel. The display device 140 can be a television, a monitor, a projector, and the like, with a display interface using the same display interface standard as that of the display interface 135.

It is to be understood that, in some embodiments, the set-top box 130 can take a form of a dongle that has a connector, such as a HDMI connector, and can be plugged into the display device 140. Alternatively, the functions and structures of the set-top box 130 and the display device 140 can be integrated into one device.

Figure 2:
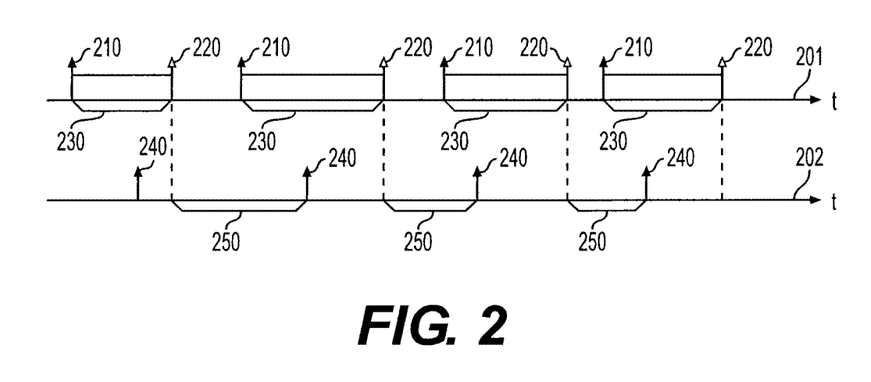
FIG. 2 shows timings of a decoding and displaying process according to an embodiment.

FIG. 2 shows the timings of the decoding and displaying process described above according to an embodiment of the disclosure. The timings of the decoding starting times indicated by arrows 210 and the decoding ending times indicated by arrows 220 of video frames during the decoding operation of the decoder 133 are shown on a first time line 201, and the timings of the display times indicated by the arrows 240 of video frames are shown on a second time line 202. As shown, the display times of video frames are evenly distributed along the second time line 202 due to that the display rate of the display interface 135 is preconfigured at a fixed display rate. However, the decoding starting times and the decoding ending times of video frames are randomly distributed along the first time line 201. Consequently, the decoding times 230 between the decoding starting times and the decoding ending times changes from video frame to video frame, and the waiting times 250 of each video frame between the decoding ending times and the display times also changes from video frame to video frame. In addition, changes of the waiting times 250 are determined by the arriving of the decoding ending times indicated by the arrows 220. These waiting times 250 incur the video latency at the video processing unit 132 and need to be reduced to decrease the video latency.

Figure 3:
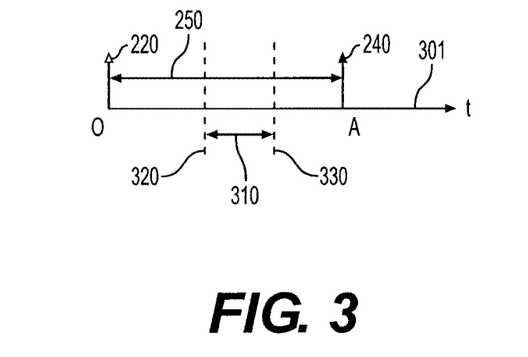
FIG. 3 shows a display latency window according to an embodiment.

According to an aspect of the disclosure, a display latency window (DL window) is defined in the scheme for reducing video latency. FIG. 3 illustrates the DL window according to an embodiment of the disclosure. In FIG. 3, an arrow 220 indicting the decoding ending times of video frames is located at the origin point O of a time axis 301, and an arrow 240 indicating the display times of video frames is located at a point A on the time axis 301. Accordingly, the time difference 250 between the two arrows 220 and 240 represents the waiting times of video frames stored in the frame buffer 134. The DL window is defined as a section 310 along the time axis 301 between a minimum display latency (min DL) indicated by a dashed line 320 and a maximum display latency (max DL) indicated by a dashed line 330. For the brevity of description, the numbers 220, 240, 250, 310, 320, and 330 in FIG. 3 used above for referencing the arrows, dashed lines, or time differences are also used below for referencing the decoding ending times 220, the display times 240, the waiting times 250, the DL window 310, the min DL 320, the max DL 330, respectively. In an example, the display interface 135 operates at a display rate of 60 Hz, and the waiting times 250 can varies from 0 to 16.7 ms (the reciprocal of 60 Hz). Accordingly, the size of the DL window 310 can be defined in a range of 2-5 ms, and the min DL 320 can be defined in a range of 2-5 ms.

According to an aspect of the disclosure, a goal of the scheme for reducing video latency is to control the length of the waiting times 250 thus that the waiting times 250 are within the DL window 310. During the decoding and displaying process described above, the waiting times 250 change for different video frames, and can be shorter than the min DL 320, longer than the max DL 330 or within the DL window 310. When the waiting times 250 are shorter than the min DL 320, there is a risk that the display interface 135 starts to read a video frame from the frame buffer 134 at a time earlier than the decoding ending time of the video frame, thus the video frame has to be dropped causing display glitch, or the video frame including old pixel data of a previous video frame is displayed causing screen tearing. On the other side, when the waiting times 250 are longer than the max DL 330, unwanted video latency is incurred. Therefore, controlling the waiting times 250 to be within the DL window 310 is desirable.

In an embodiment, the display rate of the display interface 135 is adjusted to change timings of the display time 240 of video frames in order to control the length of the waiting times 250 to be within the DL window 310. In an example, after the waiting times are observed longer than the max DL 330 during a period of time, the display rate of the display interface 135 is increased to reduce the waiting times 250. Specifically, when the display rate of the display interface 135 is increased from an original display rate to an adjusted display rate, a display interval between two display times 240 of the display interface 135 will be decreased. Accordingly, arrival timings of the display times 240 corresponding to the adjusted display rate becomes earlier than arrival timings of the display times 240 corresponding to the original display rate. Gradually, the waiting time 250 can be reduced until within the DL window 310. In an example, the display interface 135 initially operates at a display rate of 60 Hz and a display interval between two display operations is about 16.67 ms. The waiting times 250 of video frames longer than the max DL are observed, for example, an average waiting time 250 is 2 ms longer than the max DL during a predetermined window of time. A window of time refers to a period of time, e.g., in a range of 500 ms-3000 ms, that ends at the current time. Subsequently, the display rate of the display interface 135 can be increased using a change rate of 0.2% from 60 Hz to 60.12 Hz, thus the display interval between two display operations is reduced to be about 16.63 ms. Thus, it take $$\frac{2 \text{ ms}}{\frac{1}{60 \text{ Hz}} - \frac{1}{60.12 \text{ Hz}}} \approx 60$$

times of display operations, or about $$60 \times \frac{1}{60.12 \text{ Hz}} =$$

998 ms for the waiting times 240 to become 2 ms shorter than its original length.

After the waiting times 250 has been reduced to be within the DL window 310 in the above examples, if the display rate of the display interface 135 is maintained at the adjusted display rate, the waiting times 250 will be continually reduced, and consequently an overshooting can be incurred. An overshooting in the above examples refers to a situation in which the reduction of the display rate causes the waiting times to be shorter than the min DL after the waiting times have been controlled to be within the DL window 310. Similarly, when the display rate of the display interface 135 is reduced to increase the waiting times from below the min DL to within the DL window, an overshooting may cause the waiting times to be longer than the max DL. Therefore, after the waiting times 250 has been reduced to be within the DL window 310 in the above examples, the display rate of the display interface 135 can be changed back to the original display rate from the adjusted display, thus the waiting times 150 can be kept at the current length during the decoding and display process.

According to an aspect of the disclosure, overshootings can lead to oscillations of the adjustment processes described above, or cause frame droppings when the waiting times are overly short thus display times are close to decoding ending times of video frames. Accordingly, parameters related with the adjustment processes should be selected thus that overshootings can be controlled to avoid the oscillations and frame droppings.

Figure 4:
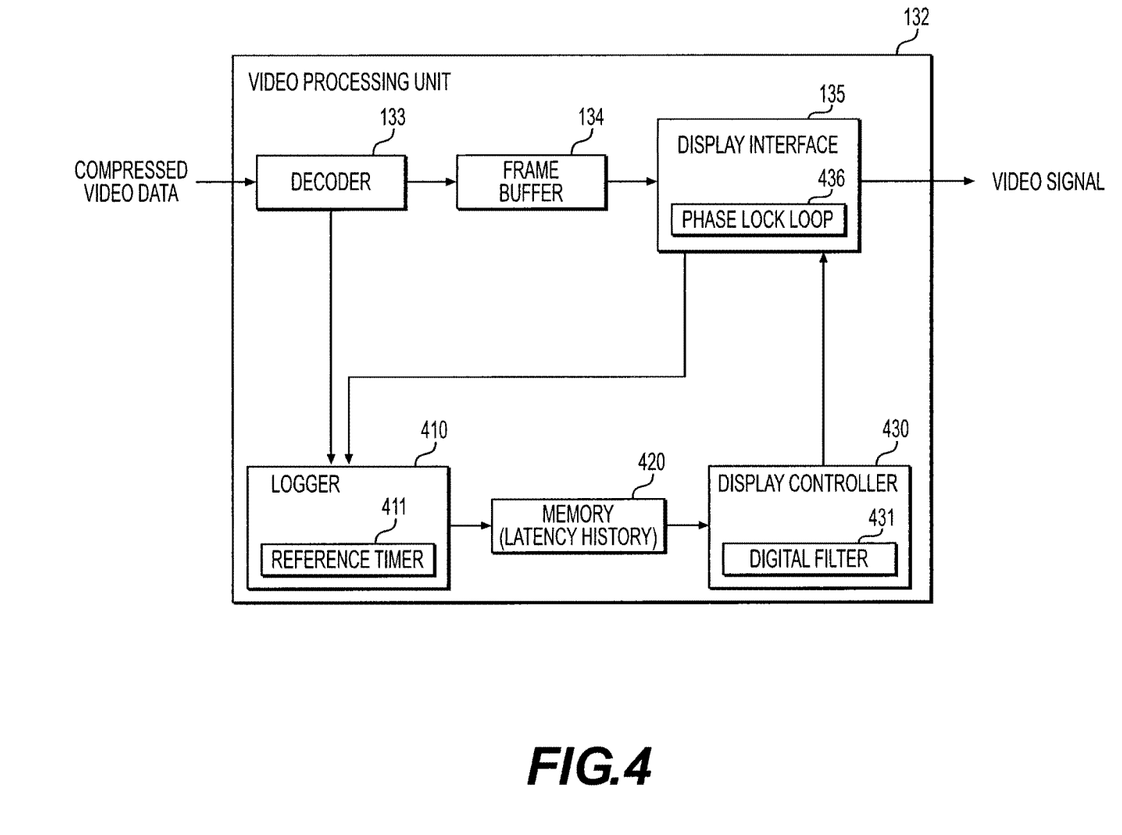
FIG. 4 shows a video processing unit according to an embodiment.

FIG. 4 shows the video processing unit 132 previously shown in FIG. 1 with more details according to an embodiment of the disclosure. In addition to the decoder 133, the frame buffer 134, and the display interface 135, the video processing unit 132 includes a logger 410, a memory 420, and a display controller 430. Descriptions of the functions and structures of the decoder 133, the frame buffer 134, and the display interface 135 that have been described with reference to FIG. 1 are omitted for the brevity of description. However, the decoder 133 and the display interface 135 include additional functions that are described below.

In an embodiment, the decoder 133 is configured to transmit a signal to the logger 410 when the decoding operation of each video frame is completed during the decoding process described above, and the signal indicates the decoding ending time of each video frame. In another embodiment, the decoder 133 and the logger 410 can communicate using a communication protocol. Accordingly, the decoder 133 can transmit a message based on the communication protocol to the logger 410 when the decoding operation of each video frame is completed, and the message indicates the decoding ending time of each video frame. Based on the signal or the message, the logger 410 can log the decoding ending times of each video frame.

Similarly, in various embodiments, the display interface 135 can be configured to transmit a signal or a message to the logger 410 when the display interface 135 starts to display each video frame during the display process described above, and the signal or the message can indicate the display time of each video frame. Based on the signal or the message, the logger 410 can log the decoding ending times of each video frame.

The logger 410 can be configured to log the decoding ending time and the display time of each video frame based on the signals or messages received from the decoder 133 and the display interface 135. In an embodiment, the logger includes a reference timer 411 that is configured to measure time. In an example, the reference timer 411 is a digital counter that can be configured to increase or decrease at a fixed frequency. When a signal or a message is received from the decoder 133, the logger 410 can store a timer value of the reference timer 411 to the memory 420 to record a decoding ending time of a video frame. Similarly, when a signal or a message is received from the display interface 135, the logger 410 can store a timer value of the reference timer 411 to the memory 420 to record a display time of a video frame.

In alternative embodiments, the decoder 133 and the display interface 135 can maintain local reference timers that are synchronized to a system clock signal. Accordingly, the decoder 133 and the display interface 135 can transmit to the logger 410 timer values of the local reference timers corresponding to the decoding ending times and the display times of each video frame. Subsequently, the logger 410 can store the timer values into the memory 420.

In an embodiment, the logger 410 is configured to generate a latency history over a window of time. The latency history includes a sequence of records of decoding ending times and display times of video frames that is generated from the decoder 133 and stored in the frame buffer 134 for subsequent display by the display interface 135. Additionally, the latency history can also include decoding starting times of video frames. The latency history is maintained over a window of time, for example, having a length of 1000 ms. In an example, new records of decoding ending times and display times are continually written into the memory 420 and old records of decoding ending times and display times that are logged before a starting time of current window of time are removed from the memory 420, thus keeping the latest records within the window of time.

The memory 420 is configured to store the latency history. The memory 420 can be a RAM, a flash memory, and the like, in various embodiments.

The display controller 430 is configured to adjust the display rate of the display interface 135 based on the latency history in order to change waiting times of video frames. In an embodiment, the display controller 430 first determines an average waiting time of video frames based on the latency history. The average waiting time of video frames is an indicator indicating an average video latency of the video frames over the window of time. The average waiting time can be calculated based on the latency history using various algorithms. The algorithms process the sequences of the records included in the latency history to generate the average waiting time of the videos. In an example, the display controller 430 uses an arithmetic mean algorithm to determine the average waiting time of the videos. Specifically, in the example, the latency history includes N pairs of decoding ending times and display times corresponding to N video frames, and a sequence of N waiting times corresponding to N video frames can be computed by subtracting the decoding ending time from the display time of each video frame. Subsequently, the sum of the N waiting times can be divided by N to obtain the average waiting time of the video frames over the window of time. In another example, an algorithm first removes from the sequence of the waiting times some momentarily changed waiting times. In an example, the momentarily changed waiting times refers to waiting times that are above or below the arithmetic average of the waiting times over the widow of time with a value larger than a threshold value and account for a percentage of all waiting times lower than, for example, 1%. Then, a mathematic mean of the rest of the waiting times over the window of time is calculated. If the waiting times that are above or below the arithmetic average of the waiting times over the widow of time with a value larger than the threshold value but account for a percentage of all waiting times higher than, for example, 1%, these waiting times together with the rest of the waiting times will be used for calculating the mathematic mean of all the waiting times. In this way, momentarily changes of the waiting times are not considered when determine the average waiting time of video frames.

In an embodiment, the display controller 430 includes a digital filter 431, and the digital filter 431 is configured to filter the latency history to determine the average waiting time of video frames. The digital filter 431 is a functional block that filters (processes) the sequences of the records included in the latency history to generate the average waiting time of the videos. The digital filer 431 implements the above described various algorithms for processing the sequences of the records included in the latency history to generate the average waiting time of the videos. The digital filer 432 can be implemented using any suitable software, hardware or a combination thereof in various embodiments.

In an embodiment, the display controller 430 is configured to determine a change rate of the display rate of the display interface 135 for adjusting the display rate of the display interface 135. The change rate refers to a percentage, e.g. in a range of 0.2%-0.5%, of an original display rate of the display interface 135 used for adjusting the original display rate to an adjusted display rate. The change rate can be determined based on a plurality of factors, such as an acceptable range of the display device 140, and a trade-off between a desired convergence speed of waiting times of video frames converging to DL window and a frame dropping rate caused by overshooting of adjustment of the display rate of the display interface 135.

In an example, the display controller 430 determines a change rate that is within an acceptable range of the display device 140. The acceptable range of the display device 140 for the change rate indicates a capability of the display device 140 in the FIG. 1 example for adjusting the display rate. For example, the display device 140 is a computer monitor that operates at an original display rate of 60 Hz and is capable of adjusting the display rate in a range from 59.88 Hz to 60.12 Hz. Thus, when the display controller determines the change rate of the display rate of the display interface 135 corresponding to the computer monitor, the change rate is selected thus that an adjusted display rate of the display interface 135 based on the change rate does not exceed the range of 59.88 Hz-60.12 Hz.

In another example, the display controller 430 determines a change rate based on a trade-off between a convergence speed of the waiting times of video frames converging to the display latency window and a frame dropping rate (number of frame dropped over a period of time) caused by overshooting of adjustment of the display rate of the display interface. Typically, higher convergence speed of waiting times of video frames to DL window can reduce video latency faster, thus leading to better user experience. In order to obtain higher convergence speed of waiting times, a larger change rate of the display rate of the display interface 135 can be determined. However, a larger change rate can cause an overshooting with larger deviation from the DL window 310. For example, the display controller 430 processes the sequence of records to determine an average waiting time over a window of time. After an overshooting takes place, it can take some time for the display controller 430 to generate an average waiting time that is shorter that the min DL 320 and reflects the effect of overshooting. Thus, the larger the change rate is, the larger the deviation of the overshooting can be.

The overshooting with larger deviation from the DL window 310 can cause higher risk of frame dropping leading to worse user experience. Therefore, when the display controller determines the change rate of the display rate of the display interface 135, the change rate is selected according to a predetermined frame dropping rate threshold. Specifically, an initial change rate can be selected for adjusting the display rate. During the display rate adjustment process, the display controller 430 can compute a frame dropping rate by comparing the decoding ending times and the display times in the latency history and monitor the frame dropping rate continually. If the frame dropping rate is higher than a predetermined frame dropping rate threshold during the display rate adjustment process using the previously selected change rate, the display controller 430 can decrease the change rate. On the other hand, if the frame dropping rate is lower than the predetermined frame dropping threshold, the display controller 430 can increase the change rate, thus obtaining a higher convergence speed of waiting times of video frames.

In an embodiment, the display controller 430 is configured to adjust the display rate of the display interface 135 to change waiting times of video frames based on the average waiting time of video frames and the change rate determined above. Specifically, after the average waiting time of video frames over the window of time has been determined based on the latency history, the display controller 430 can adjust the display rate of the display interface 135 when the average waiting time is out of the DL window 310. When the average waiting time of video frames is longer than the max DL of the DL window, the display controller 430 can increase the display rate of the display interface 135 to reduce the waiting times of video frames. On the other side, when the average waiting time of video frames is shorter than the min DL of the DL window, the display controller 430 can reduce the display rate of the display interface 135 to increase the waiting times of video frames. In addition, the display controller 430 adjusts the display rate according to the change rate determined above. In an example, the display controller 430 can transmit a signal indicating the change rate to the display interface 135 to change the display rate. In another example, the display controller 430 can transmit a message to the display interface 135 based on a communication protocol between the display controller 430 and the display interface 135. The message can include information of the change rate used for changing the display rate of the display interface 135.

As shown in FIG. 4, in an embodiment, the display interface 135 includes a phase lock loop 436 that is configured to control the display rate of the display interface 135. For example, the phase lock loop 436 can include a phase detector, a frequency-variable oscillator, and a feedback path. The oscillator can generate a periodic signal that is used for triggering the display operation of the display interface 135, and the frequency of the periodic signal can determine the display rate of the display interface 135. The phase detector can compare the phase of a fed-back signal transmitted from the feedback path with the phase of a reference signal, for example, a system clock signal of the video processing unit 132, and adjusts the oscillator to keep the two phase matched. The feedback path can include a frequency multiplier that receives the periodic signal and generate the fed-back signal that is a submultiple of the periodic signal. In an example, information of a change rate of the display rate of the display interface 135 is received via a signal or a message transmitted from the display controller 430, and the change rate is used to change multiplication ratio of the frequency multiplier, thus adjusting the periodic signal and consequently adjusting the display rate of the display interface 135. For example, a received change rate of 0.2% is used for increasing the display rate, and accordingly the multiplication ratio of the frequency multiplier can be increased by 0.2% to increase the frequency of the periodic signal.

In an embodiment, the display controller 430 is configured to, after an adjustment of the display rate of the display interface, wait for a predetermined period of time before another adjustment of the display rate of the display interface. For example, after the display controller 430 transmits a signal or a message including information of the change rate used for adjusting the display rate of the display interface 135 to an adjusted display rate, the display controller 430 waits for a predetermined period of time, e.g., 1000 ms, before transmitting another signal or message. During the predetermined period of time, the display controller 430 can pause the process of determining the average waiting times and adjusting the display rate of the display interface 135. Thus, the adjusted display rate can be kept at the same level avoiding being adjusted multiple times while waiting times of video frames are being changed. At the end of the predetermined period of time, the display controller 430 can restart the process of determining the average waiting times and adjusting the display rate of the display interface 135 based on the average waiting times.

Figure 5:
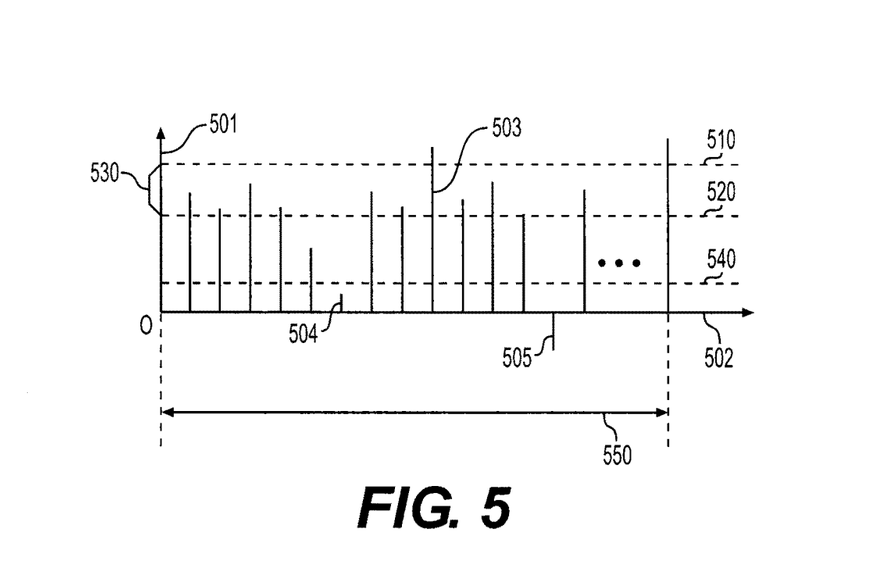
FIG. 5 shows a sequence of waiting times over a window of time according to an embodiment.

FIG. 5 shows a sequence of waiting times 503 over a window of time 550 according to an embodiment of the disclosure. The window of time 550 represents a time period ending at current time. The sequence of waiting times 505 over the window of time 550 is represented by a sequence of segments perpendicular to a time axis 502 in a coordinate system. FIG. 5 also includes a vertical axis 501 representing length of waiting times. Accordingly, lengths of the segments perpendicular to a time axis 502 represent lengths of waiting times. As shown, a max DL 510 and a min DL 520 of a DL window 530 are represented by horizontal lines 510 and 520. The distance between the two the horizontal lines 510 and 520 indicates the DL window. In addition, a threshold 540 represented by a horizontal line 540 is shown in FIG. 5.

In an embodiment, the display controller 430 is configured to adjust the max DL 510 or the min DL 520 of the DL window 530 according to a history of waiting times over the window of time 550. It is noted that the window of time 550 used for recording a history of waiting times for adjusting the max DL 510 or the min DL 520 of the DL window 530 is different from the window of time used for recording the latency history for determining an average waiting time as described with reference to FIG. 4. For sake of clarity, the former is referred to as the second window of time and the latter is referred to as the first window of time below. The second window of time can be longer than the first window of time. For example, the second window of time can be in a range of 10 s-60 s. Similar to generating the latency history over a first window of time, the history of waiting times over the second window of time can be logged by the logger 410 and stored in the memory 420.

Specifically, in an example, the display controller 430 counts a number of waiting times that are shorter than the threshold 540 during the second window of time 550. For example, in FIG. 5, a waiting time 504 is shorter than the threshold 540, and another waiting time 505, which has a negative value meaning the display time corresponding to the waiting time 505 is ahead of the decoding ending time corresponding to the waiting time 505, is also shorter than the threshold 540. If the counted number of the waiting times shorter than the threshold 540 over a second window of time are larger than a predetermined threshold value, the display controller 430 can move the DL window up along the waiting time axis 501 (increase the values of max DL and min DL), thus reducing the frame dropping risk.

In addition, the display controller 430 can move down the DL window along the waiting time axis 510 if no waiting times shorter than the threshold 540 are observed. For example, a difference between a shortest waiting time during the second window of time 550 and the threshold 540 can be used as the distance for moving the DL window down along the waiting time axis 501.

In an embodiment, in addition to the scheme of reducing video latency described above, the display controller 430 is configured to synchronize decoding starting times of video frames and display times of the display interface 135 based on timing information included in the compressed video data. In one example, the video data is encoded using the MPEG-2 video compression standard, and the compressed video data forms a MPEG transport stream. Packets in the transport stream can include a Program Clock Reference (PCR) code. The PCR code includes timing information that can be used to generate a second system time clock at the decoder 133 that is locked to a first system time clock at the decoder in the computer 110 in FIG. 1. Based on the synchronized first and the second system time clocks, the coding operation and decoding operation can be synchronized. In addition, using the second system time clock, the display times of the display interface 135 can be synchronized with the decoding starting times of the decoder 133. When the display times of the display interface 135 and the decoding starting times of the decoder 133 are synchronized, if waiting times of video frames longer than max DL or shorter than min DL are observed, for example, by computing an average waiting time based on a latency history over a window of time, the controller 430 can adjust the display rate of the display interface 135 from an original display rate to an adjusted display rate to change the waiting times. During this adjustment process, the display times of the display interface may not be synchronized with the decoding starting times of the decoder 133. After the adjustment process, the display rate of the display interface 135 can be changed back to the original display rate, and accordingly, the display times of the display interface can be synchronized with the decoding starting times of the decoder 133 again. It is noted that, in addition to MPEG-2, the compressed video data can be generated based on various video compression standards such as MPEG-4, HEVC, and the like, in various embodiments. Accordingly, timing information included in the compressed video data in various formats can also be used to synchronize decoding starting times of video frames and display times of the display interface 135.

Figure 6:
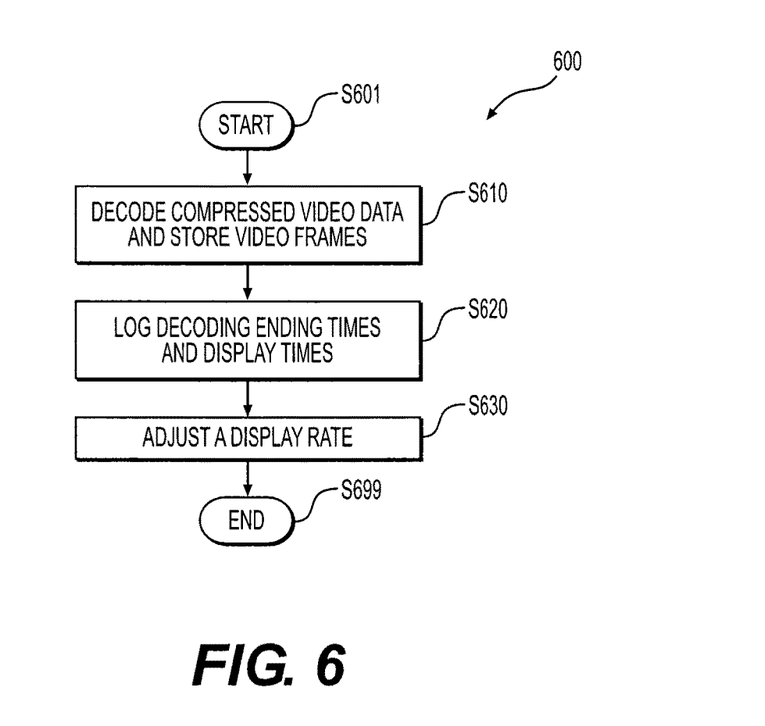
FIG. 6 shows a process for changing waiting times of video frames in a frame buffer according to an embodiment.

FIG. 6 shows a process 600 for changing waiting times of video frames in a frame buffer according to an embodiment of the disclosure. The process 600 is described with reference to the video processing unit 132 shown in FIG. 4. The process 600 starts at S601 and proceeds to S610.

At S610, compressed video data is received and decoded into video frames at the decoder 133. The video frames are stored in a frame buffer for subsequent display by the display interface 135.

At S620, decoding ending times of video frames and display times of video frames over a first window of time are logged by the logger 410 to generate a latency history over the first window of time. The latency history includes a sequence of records of the decoding ending times and display times of video frames, and can be stored in the memory 420.

At S630, a display rate of the display interface 135 is adjusted based on the latency history to change waiting times of video frames stored in the frame buffer. Specifically, an average waiting time over the first window of time can be calculated based on the records in the latency history. In addition, a change rate of the display interface 135 can be determined. When the average waiting time is longer than a max DL of a DL window, the display rate of the display interface 135 can be increased according to the change rate in order to reduce the waiting times of video frames. On the other side, when the average waiting time is shorter than a min DL of a DL window, the display rate of the display interface 135 can be decreased according to the change rate in order to increase the waiting times of video frames. The process 600 proceeds to S699 and terminates at S699.

The functions and process described above can be implemented with any suitable software, hardware or a combination of software and hardware in various embodiments. For example, the functions and the process can be implemented with software programs comprised of computer-executable instructions that can be stored in a computer-readable media and can run on one or more central processing units (CPUs). In other examples, the functions and process can be implemented with application-specific integrated circuits (ASICs), field-programmable gate arrays (FPGAs), or discrete component circuits.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    receiving compressed video data;
    decoding the compressed video data into video frames and storing the video frames in a frame buffer for subsequent display by a display interface;
    logging a decoding ending time and a display time for each of the video frames over a first window of time to generate a latency history including a sequence of records of the logged decoding ending times and display times, wherein the decoding ending time is a time at which the decoding of compressed video data for a corresponding video frame is completed and the display time is a time at which the display interface reads the corresponding video frame from the frame buffer; and
    adjusting a display rate of the display interface based on the latency history over the first window of time in order to change waiting times of video frames such that an average waiting time of video frames is within a display latency window, each waiting time of a video frame being a difference between the decoding ending time of the video frame and the display time of the video frame.

2. The method of claim 1, wherein adjusting the display rate of the display interface to change the waiting times of video frames based on the latency history includes:
    determining an average waiting time of a first set of video frames based on the latency history over the first window of time; and
    increasing the display rate of the display interface to reduce waiting times of a second set of video frames when the average waiting time of the first set of video frames is longer than a maximum display latency of the display latency window.

3. The method of claim 1, wherein adjusting the display rate of the display interface to change the waiting times of video frames based on the latency history includes:
   determining an average waiting time of a first set of video frames based on the latency history over the first window of time; and
   decreasing the display rate of the display interface to increase waiting times of a second set of video frames when the average waiting time of the first set of video frames is shorter than a minimum display latency of the display latency window.

4. The method of claim 3, wherein determining the average waiting time of the first set of video frames based on the latency history over the first window of time includes:
   filtering the latency history to determine the average waiting time of the first set of video frames.

5. The method of claim 3, wherein determining the average waiting time of the first set of video frames based on the latency history over the first window of time includes:
   removing a momentarily changed waiting time from a sequence of waiting times used for determining the average waiting time of video frames, the sequence of waiting times being computed based on the latency history over the first window of time.

6. The method of claim 3, wherein adjusting the display rate of the display interface to change the waiting times of video frames based on the latency history further includes:
   determining a change rate of the display rate of the display interface for adjusting the display rate of the display interface, the change rate being in a range acceptable to a display device connected to the display interface.

7. The method of claim 3, wherein adjusting the display rate of the display interface to change the waiting times of video frames based on the latency history further includes:
   determining a change rate of the display rate of the display interface for adjusting the display rate of the display interface based on a trade-off between a convergence speed of the waiting times of video frames converging to the display latency window and a frame dropping rate caused by overshooting of adjustment of the display rate of the display interface.

8. The method of claim 1, further comprising:
   adjusting a maximum display latency or a minimum display latency of the display latency window according to a history of waiting times over a second window of time.

9. The method of claim 1, further comprising:
   synchronizing decoding starting times of video frames and the display times of the display interface based on timing information included in the compressed video data.

10. The method of claim 1, further comprising:
   after an adjustment of the display rate of the display interface, waiting for a predetermined period of time before performing another adjustment of the display rate of the display interface.

11. A device, comprising:
   a decoder to receive compressed video data and decode the compressed video data into video frames;
   a frame buffer to store the video frames;
   a display interface to read the video frames from the frame buffer and display the video frames at a display rate;
   a logger to log a decoding ending time and a display time for each of the video frames over a first window of time to generate a latency history including a sequence of records of the logged decoding ending times and display times, wherein the decoding ending time is a time at which the decoding of compressed video data for a corresponding video frame is completed and the display time is a time at which the display interface reads the corresponding video frame from the frame buffer; and
   a display controller to adjust a display rate of the display interface based on the latency history over the first window of time in order to change waiting times of video frames such that an average waiting time of video frames is within a display latency window, each waiting time of a video frame being a difference between the decoding ending time of the video frame and the display time of the video frame.

12. The device of claim 11, wherein the display controller is further configured to,
   determine an average waiting time of a first set of video frames based on the latency history over the first window of time, and
   increase the display rate of the display interface to reduce waiting times of a second set of video frames when the average waiting time of the first set of video frames is longer than a maximum display latency of the display latency window.

13. The device of claim 11, wherein the display controller is further configured to,
   determine an average waiting time of a first set of video frames based on the latency history over the first window of time; and
   decrease the display rate of the display interface to increase waiting times of a second set of video frames when the average waiting time of the first set of video frames is shorter than a minimum display latency of the display latency window.

14. The device of claim 13, wherein the display controller is configured to,
   filter the latency history to determine the average waiting time of the first set of video frames.

15. The device of claim 13, wherein the display controller is configured to,
   remove a momentarily changed waiting time from a sequence of waiting times to determine the average waiting time of video frames, the sequence of waiting times being computed based on the latency history over the first window of time.

16. The device of claim 13, wherein the display controller is configured to,
   determine a change rate of the display rate of the display interface for adjusting the display rate of the display interface, the change rate being in a range acceptable to a display device connected to the display interface.

17. The device of claim 13, wherein the display controller is configured to,
   determine a change rate of the display rate of the display interface for adjusting the display rate of the display interface based on a trade-off between a convergence speed of the waiting times of video frames converging to the display latency window and a frame dropping rate caused by overshooting of adjustment of the display rate of the display interface.

18. The device of claim 11, wherein the display controller is further configured to,
   adjust a maximum display latency or a minimum display latency of the display latency window according to a history of waiting times over a second window of time.

19. The device of claim 11, wherein the display controller is further configured to,
   synchronize decoding starting times of video frames and the display times of the display interface based on timing information included in the compressed video data.

20. The device of claim 11, wherein the display controller is further configured to,
   after an adjustment of the display rate of the display interface, wait for a predetermined period of time before performing another adjustment of the display rate of the display interface.

* * * * *